US011153716B1

(12) United States Patent
Madden et al.

(10) Patent No.: US 11,153,716 B1
(45) Date of Patent: Oct. 19, 2021

(54) GEOLOCATION POLLING FREQUENCY FOR HOME AUTOMATION

(71) Applicant: Alarm.com Incorporated, Tysons, VA (US)

(72) Inventors: Donald Madden, Columbia, MD (US); Aaron Lee Roberts, Centreville, VA (US); Bret Jutras, Sterling, VA (US)

(73) Assignee: Alarm.com Incorporated, Tysons, VA (US)

( * ) Notice: Subject to any disclaimer, the term of this patent is extended or adjusted under 35 U.S.C. 154(b) by 56 days.

(21) Appl. No.: 16/731,166

(22) Filed: Dec. 31, 2019

Related U.S. Application Data

(60) Provisional application No. 62/788,296, filed on Jan. 4, 2019.

(51) Int. Cl.
*H04L 12/28* (2006.01)
*H04W 4/029* (2018.01)
*H04W 4/021* (2018.01)
*H04L 12/26* (2006.01)
*G01S 19/51* (2010.01)

(52) U.S. Cl.
CPC ......... *H04W 4/029* (2018.02); *H04L 12/2816* (2013.01); *H04L 43/103* (2013.01); *H04W 4/021* (2013.01); *G01S 19/51* (2013.01)

(58) Field of Classification Search
CPC ............. H04L 12/2803; H04L 12/2818; H04L 12/2825; H04L 12/2816; H04L 12/2642; H04L 48/081; H04L 12/2807; H04L 12/2809; H04L 12/2829; H04M 1/72533; G05B 2219/25011; G05B 2219/2642; G05B 2219/2614; G05B 15/02; H04Q 9/00
See application file for complete search history.

(56) References Cited

U.S. PATENT DOCUMENTS

| 7,149,504 | B1 * | 12/2006 | Weaver | H04W 64/00 455/414.2 |
| 8,229,421 | B2 | 7/2012 | Hotes et al. | |
| 9,854,385 | B2 | 12/2017 | Oliver et al. | |
| 2005/0182671 | A1 * | 8/2005 | Miyauchi | G06Q 30/06 705/5 |
| 2008/0014908 | A1 * | 1/2008 | Vasant | G08G 1/096888 455/414.1 |
| 2009/0088962 | A1 * | 4/2009 | Jones | G06F 16/9537 701/519 |
| 2011/0218831 | A1 * | 9/2011 | Bolling | G06Q 30/0277 705/5 |

(Continued)

FOREIGN PATENT DOCUMENTS

EP 1473959 11/2004

*Primary Examiner* — Rafael Pérez-Gutiérrez
*Assistant Examiner* — Xiang Zhang
(74) *Attorney, Agent, or Firm* — Fish & Richardson P.C.

(57) ABSTRACT

Methods, systems, and apparatus, including computer programs encoded on a computer storage medium, for geolocation polling. The methods, systems, and apparatus include actions of receiving a location update from a user device of a user, determining an earliest time of arrival of the user to a home, determining, based on the earliest time of arrival, a time interval for a next location update, and providing instructions to the user device of the time interval for a next location update.

19 Claims, 5 Drawing Sheets

(56) References Cited

U.S. PATENT DOCUMENTS

| | | | | |
|---|---|---|---|---|
| 2012/0310376 | A1* | 12/2012 | Krumm | G05B 15/02 |
| | | | | 700/31 |
| 2014/0167929 | A1* | 6/2014 | Shim | G08C 17/02 |
| | | | | 340/12.5 |
| 2014/0351411 | A1* | 11/2014 | Woods | H04W 4/21 |
| | | | | 709/224 |
| 2015/0159893 | A1* | 6/2015 | Daubman | H04L 12/2823 |
| | | | | 700/278 |
| 2015/0338116 | A1* | 11/2015 | Furuta | F24F 11/30 |
| | | | | 700/276 |
| 2016/0366635 | A1* | 12/2016 | Cui | H04W 48/04 |
| 2017/0008516 | A1* | 1/2017 | Itagaki | B60W 10/196 |

\* cited by examiner

GEOLOCATION POLLING FREQUENCY FOR HOME AUTOMATION

CROSS-REFERENCE TO RELATED APPLICATIONS

This application claims the benefit of U.S. Provisional Application No. 62/788,296, filed Jan. 4, 2019, which is incorporated by reference in its entirety.

TECHNICAL FIELD

This disclosure relates generally to location tracking services.

BACKGROUND

Many people utilize location-tracking services for monitoring their location, where the location tracking services can be part of a mobile device that has a limited battery life.

SUMMARY

Techniques are described for location tracking using dynamic polling intervals to optimize tracking of a person as they are traveling from a point of origin to a home enabled with home automation functionality.

More specifically, techniques are described for optimized location tracking by dynamically adjusting a polling frequency of a user device associated with the user based in part on a determined estimated time of arrival of the user to the home. Estimated time of arrival can be used by a home monitoring system, for example, to engage home automation functionality (e.g., HVAC system, security system, appliance controls, etc.).

Implementations of the described techniques may include hardware, a method or process implemented at least partially in hardware, or a computer-readable storage medium encoded with executable instructions that, when executed by a processor, perform operations.

The techniques described in this disclosure provide one or more of the following advantages. Dynamically adjusting the interval between utilizing the location-based services (e.g., GPS services) of a mobile device based in part on the proximity of the mobile device to a home location can reduce usage of the location-based services when the mobile device is further from the home location, thereby extending the battery life of the mobile device. Additionally, battery life can be conserved by reducing usage of location-based services until the mobile device is predicted to be nearing a particular destination.

Aggregation of user habits including, for example, routes, estimated commute times, known stops along the route, and the like, can be used to recognize patterns for the person to better estimate an expected arrival time of a person to the home and engagement of home automation services (e.g., know when to adjust HVAC settings in the home prior to driver arrival). In some implementations, habits of multiple users who follow similar patterns, e.g., users who utilize similar commuting routes, users who are determined to be in a same vehicle or public transit mode, and/or third party data (e.g., public transit schedules and traffic data), can be aggregated to better predict expected arrival times of a person at a destination.

In some implementations, location-tracking for expected time of arrival of a user to a home can be used to engage home automation services in a timely manner, such that home automation services are not engaged too soon or too late with respect to the arrival time, thereby improving energy usage, e.g., HVAC system is not ramped up unnecessarily early and sets climate control settings long before a user arrives at home.

The details of one or more implementations are set forth in the accompanying drawings and the description below. Other features will be apparent from the description and drawings, and from the claims.

DETAILED DESCRIPTION

Techniques are described for location tracking using a dynamic geolocation polling frequency to optimize tracking of a person as they are arriving from a location (e.g., a work location) to a home enabled with home automation functionality. The dynamic geolocation polling frequency can depend, for example, on an estimated time for a person to arrive at the home, a location of the user device relative to one or more of geo-fences, points of interest along a route, driver patterns/routines, third-party data (e.g., traffic data), and the like. In one embodiment, the frequency of geolocation polling is increased as the minimum travel time to reach a destination decreases. In another embodiment, the frequency of geolocation polling is increased when a person is determined to be near a point along a route where the person is known to deviate from the route, e.g., where a user is determined to take alternate routes based on pattern recognition. A time interval required for the home automation system of a home to update to predetermined home settings can be incorporated into the determination of a geolocation polling frequency for a user device of a person as they are traveling home.

Figure 1:
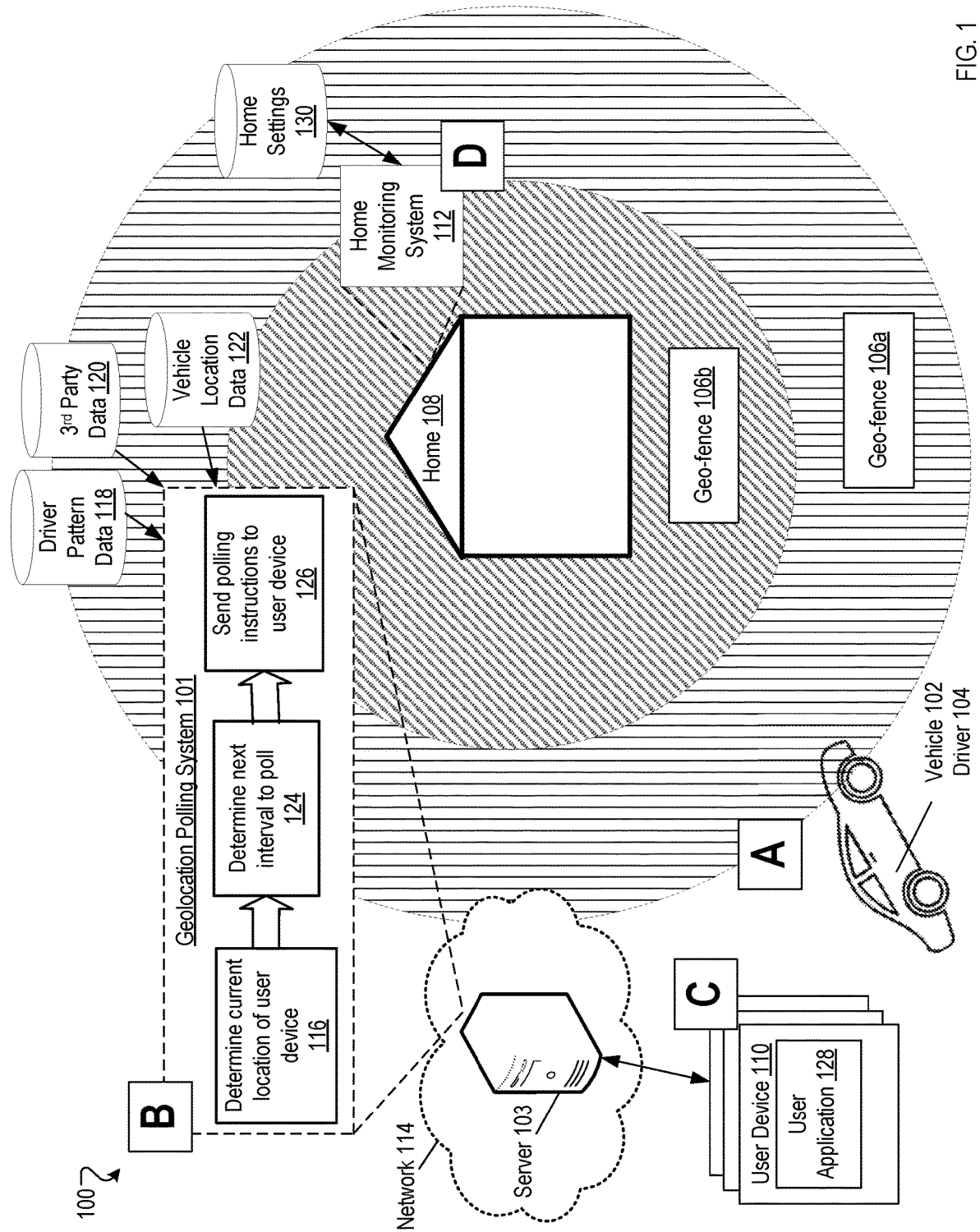
FIG. 1 is an example operating environment for a geolocation polling system.

FIG. 1 is an example operating environment 100 for a geolocation polling system 101 including a vehicle 102 and a driver 104. Driver 104 can have a user device 110, for example, a mobile phone, tablet, or another mobile device including location tracking services e.g., using global position system (GPS), control plane locating, or the like. Though described with respect to FIG. 1 as a driver 104 of a vehicle 102, the driver 104 of the user device 110 can be a commuter on public transit, a pedestrian, a cyclist, a rider in a car/ride-share service, or a combination of multiple different forms of transit. Driver 104 can be, for example, a user of user device 110 who regularly commutes using a combination of a light-rail transit line and a car/ride-share service.

Vehicle 102 can be a commercial or non-commercial vehicle, for example, a car, a truck, a bus, a flatbed, a trailer truck, or another piece of heavy machinery (e.g., a forklift, tractor, and backhoe) that is operated on a roadway. For example, a vehicle 102 can be a car belonging to a driver 104. In another example, a vehicle 102 can be a public transit vehicle (e.g., bus or train) where the driver 104 is a passenger of the vehicle 102. In yet another example, vehicle 102 can be a car/ride-share vehicle where the driver 104 is a passenger of the vehicle 102. Vehicle 102 can include an onboard control unit which can monitor and/or control various sensors (e.g., tire air pressure, engine temperature, throttle position, fuel levels, etc.), automatic transmission, anti-lock brakes, air bag deployment, keyless entry, climate control, motorized seats/mirrors, entertainment center (e.g., radio, MP3 player), cruise control, or the like. Vehicle 102 can include onboard location tracking services, for example, using a GPS.

The geolocation polling system 101 can include several geo-fences 106a, 106b where a geo-fence 106a, 106b can be a virtual geographic boundary surrounding a point of interest, for example, a geo-fence surrounding a home 108. Multiple geo-fences can be defined surrounding a home 108, for example, as concentric circles including a first geo-fence 106a and a second geo-fence 106b. Though the geo-fences 106a, 106b are depicted in FIG. 1 as circular, any number of other shapes (e.g., rectangular, polygonal, etc.) or irregular perimeters (e.g., along neighborhood lines, bounded by highways or natural boundaries, etc.) can be defined.

Home 108 can be, for example a residence (e.g., a single-family home, a town house, a condominium, or an apartment). In some implementations, a home 108 can be a commercial property (e.g., a business, government building, or a public space). Home 108 can have one or more drivers 104, where a driver 104 can be, for example, a homeowner, a resident of the home 108, a visitor to the home 108, an employee of the home 108, or the like. Driver 104 may also refer to a user that may drive a vehicle or ride in a vehicle.

Home 108 can include a home monitoring system 112. In some implementations, the home monitoring system 112, the geolocation polling system 101, or a combination of the two systems can be hosted on one or more servers 103. In some implementations, a portion or all of the backend logic processing described herein with respect to the server 103 and the geolocation polling system 101 can instead be performed locally on the user device 110.

A home monitoring system 112 can include a set of sensors located in or surrounding the home 108, including, for example, cameras, motion detectors, window/door sensors, and keypad access door locks. For example, cameras that capture video or still images of an area of the home 108 or motion detectors that sense movement in a region of the home 108. The home monitoring system 112 can include a set of controllers for home automation of systems, appliances, and electronics associated with the home 108. For example, an HVAC system controller can be integrated into the home monitoring system 112 such that the home monitoring system 112 can provide instructions for various settings through the controller to the HVAC system. Further details of the operation of the home monitoring system are discussed below with reference to FIG. 5.

In stage A, a user device 110 associated with a driver 104 enters within a particular geo-fence 106a (e.g., inside an area defined by a radius of the geo-fence 106a) where the geo-fence 106a has a particular associated polling frequency. The particular geo-fence 106a defines a first region surrounding home 108, e.g., a radius extending around a home 108 at the center (e.g., a 5-mile radius, a 10-mile radius). The polling frequency for the geo-fence 106a can be determined based in part on a distance of the geo-fence 106a from home 108, for example, a geo-fence 106a located further away from home 108 (e.g., greater than 10 miles from home 108) can have a coarse polling frequency relative to a fine polling frequency for geo-fence 106b that is located relatively closer to the home 108 (e.g., fewer than 5 miles from home 108). A coarse polling frequency can be polling the geolocation every 10 minutes, polling the geolocation every 5 minutes, or the like. The fine polling frequency can be polling the geolocation every 1 minute, polling the geolocation every 30 seconds, or the like.

In some implementations, a polling frequency associated with a particular geo-fence 106a can be predefined. For example, a geo-fence 106a that is set to be 15 miles from a home 108 can have an associated polling frequency of 5 minutes, where a user device 110 within a region defined by the geo-fence 106a and outside the geo-fence 106b will receive polling instructions from the geolocation polling system 101 including the 15-minute interval.

In some implementations, a polling frequency associated with a particular geo-fence can be a dynamic polling frequency, where the polling frequency can depend, for example, on real-time traffic data, user behavior patterns, weather data, and the like. In one example, a polling frequency for geo-fence 106a can be decreased (e.g., a longer interval between polling user device 110 location) if traffic data for an area nearby user device 110 is determined to be congested.

In stage B, the geolocation polling system 101 receives an updated location information, for example, from location-tracking services on the user device 110 through a network 114. The user device 110 can provide location information including, for example, GPS coordinates of a current location of the user device 110, to the geolocation polling system 101 as a current location of vehicle 102 and driver 104.

Network 114 can be configured to enable exchange of electronic communication between devices connected to the network 114. The network 114 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. Network 114 may include multiple networks or subnetworks, each of which may include, for example, a wired or wireless data pathway. Network 114 may include a circuit-switched network, a packet-switched data network, or any other network able to carry electronic communications (e.g., data or voice communications). For example, network 114 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. Network 114 may include one or more networks that include wireless data channels and wireless voice channels. Network 114 may be a wireless network, a broadband network, or a combination of networks includes a wireless network and a broadband network.

The geolocation polling system 101 determines the location of the user device 110 (116), based in part on the GPS information provided by the user device 110 that is associated (e.g., carried inside of the vehicle) with the vehicle 102. Determining a location of the user device 110 associated with the vehicle 102 can be an absolute location, e.g., coordinates of the user device 110 position using GPS data, or a relative location, e.g., a position of the user device 110 relative to a position of a home 108, or a combination thereof.

In some implementations, determining a location of the user device 110 associated with the driver 104 can include determining a location of the user device 110 relative to a location of home 108, e.g., a distance of travel for the user device 110 to arrive at home 108. The geolocation polling system 101 can use driver pattern data 118, $3^{rd}$ party data 120 (e.g., traffic data, map data, or the like), and/or vehicle location data 122 (e.g., previous polled locations for the vehicle along this route) to determine the location of the vehicle relative to the home 108 destination.

In some implementations, location services, e.g., GPS data, cell phone tower data, and other network connectivity can be used to determine a driver's location. Cues from sensors located on the user device 110, e.g., gyroscopes, accelerometers, and the like, can be used to the predict local movement. Relative speed of the user device 110 can be used to determine if the user device 110 is stuck in traffic or traveling at a normal speed, and an adjustment to the polling interval can be made based in part on whether the driver 104 is determined to be moving at a speed that is different than an expected speed, e.g., the driver 104 is stuck in traffic.

A next polling interval is determined (124). The next polling interval can depend in part on one or more of: the current location of the user device 110 and associated vehicle 102 relative to home 108, a polling frequency associated with the geo-fence 106a, 106b that the user device 110 is within (e.g., geo-fence 106a has an associated first polling frequency), driver pattern data 118, $3^{rd}$ party data 120, or a combination thereof. For example, a next polling interval can depend on a distance, or time to transverse the distance, of the vehicle 102 to home 108, where the polling interval is set based on how far away the user device 110 and associated vehicle 102 are from home 108. In another example, the next polling interval can depend on third-party data, where a polling interval is increased as traffic increases in the area surrounding the vehicle 102 or along a route being taken by the vehicle 102 to home 108. In yet another example, a next polling interval can depend on a geo-fence 106a, 106b within which the user device 110 is located, such that the polling frequency associated with the particular geo-fence is applied to the user device 110.

Polling instructions are sent from the geolocation polling system 101 to the user device 110 (126). Polling instructions can include operating instructions to the user device 110 for a next polling point, e.g., a next point in time to enable geolocation services and send a current location to the geolocation polling system 101. Polling instructions can be provided, for example, as a short JavaScript Object Notation (JSON) payload or another compressed form of data packet.

In some implementations, polling instructions can be operating instructions to the user device 110 for an updated polling frequency, for example, to poll a location of the user device 110 at a particular frequency (e.g., every 5 minutes, every 15 minutes, every 2 times, etc.). Polling instructions can include operating instructions where the user device 110 is instructed to disable the location-tracking services (e.g., disable the GPS) of the user device 110 until the next location polling update. Polling instructions can include operating instructions where the user device 110 is instructed when to next access location services, or can be a set of rules for when to access location services and/or data connectivity based on a combination of one or more of time, location, velocity, activity (e.g., as sensed by the accelerometer), or the like.

In some implementations, polling instructions can include instructions for polling location tracking services (e.g., GPS location) and separate instructions for providing data to the server 103. For example, instructions can include polling user device location every 10 minutes, and only upload a current location to the server 103 once the user device 110 is determined to be located within a particular geo-fence 106a.

In some implementations, polling instructions can be updated at a more or less frequent rate than a location polling frequency, for example, depending on an energy cost associated with data connectivity versus location services, an amount of other data connections being opened on the user device 110 for other purposes or by other applications, an expected rate of change of data from outside sources (e.g., because of traffic), or a combination thereof.

In stage C, user device 110 receives updated polling instructions from the geolocation polling system 101. User devices 110 may include devices that host and display application 128 including an application environment. For example, a user device 110 is a mobile device that hosts one or more native applications (e.g., application 128) that includes an application interface (e.g., a graphical-user interface (GUI)) through which a user of the user device 110 may interact with the geolocation polling system 101 and/or the home monitoring system 112. The user device 110 may be a cellular phone or a non-cellular locally networked device with a display. The user device 110 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 110 may perform functions unrelated to the geolocation polling system 101, such as placing personal telephone calls, playing music, playing video, displaying pictures, browsing the Internet, maintaining an electronic calendar, etc.

User device 110 can include user application 128, through which the driver 104 can interact with the geolocation polling system 101. The user application 128 can have access to location tracking services (e.g., a GPS) available on the user device 110 such that the user application 128 can access the location tracking services on the user device 110 according to a current set of polling instructions from the geolocation polling system 101.

In some implementations, user device 110 may have other applications that utilize location tracking services (e.g., mapping application, social media applications, or the like). Location tracking by other applications may be cached on the user device 110 such that the user application 128 may access cached location data instead of, or in addition to, making a request for updated location tracking data. In one example, the user application 128 can determine that a cached location on the user device 110 has been updated within a threshold amount of time (e.g., within the previous 2 minutes) such that it will utilize the cached location rather than requesting a updated location from the location tracking services.

In some implementations, location tracking data that has been accessed by other applications can be automatically provided to the user application 128 to verify that a current set of polling instructions are still valid. For example, if the new location data is outside the expectations, e.g., an expected route or time or arrival is not within a threshold value, a recalculation can be triggered by the geolocation polling system 101.

User application 128 refers to a software/firmware program running on the corresponding mobile device that enables the user interface and features described throughout, and is a system through which the geolocation polling system 101 may communicate with the driver 104 and with location tracking services available on user device 110. The user device 110 may load or install the user application 128 based on data received over a network or data received from local media. The user application 128 runs on mobile devices platforms, such as iPhone, iPod touch, Blackberry, Google Android, Windows Mobile, etc. The one or more user devices 110 may receive the data from the geolocation polling system 101 through the network 1XX. In one example, the user application 128 enables the user device 110 to modify, accept, or decline polling instructions from geolocation polling system 101 and home 108.

In some implementations, the user application 128 is a part of a home monitoring application for the home monitoring system 112. For example, a driver 104 of a user device 110 may receive alerts through an application 128 that are related to the geolocation polling system 101 and notifications from the home monitoring system 112 that are related to home monitoring (e.g., home security).

In stage D, the home monitoring system 112 can communicate with the geolocation polling system 101 in response to a determined location of vehicle 102. The home monitoring system 112 can communicate through the network 114 with the geolocation polling system 101. The geolocation polling system 101 can provide instructions to the home monitoring system 112, including instructions for home settings 130 for home 108, e.g., HVAC system, appliances, lighting systems, smart televisions, etc. In one example, instructions can be to sent one or more systems in the home to a particular preset home settings 130, e.g., setting a temperature for the HVAC system, turning a front porch light on, turning on a smart speaker in the home 108, and the like.

In another example, instructions can be sent to a security system to add identity verification to a detected person arriving at the home 108, e.g., notifying the security system that a user will arrive home in five minutes so that it knows the person arriving at the appointed time is the driver 104. Other examples include, but are not limited to, operation of a sprinkler system, stereo/home entertainment operations, operations to an automated cleaning system (e.g., a robot vacuum), or the like. Alerts can additionally be integrated with a home assistant to provide notification to other users that driver 104 is expected to arrive at the home 108 at a particular time, or to verify an expected time of arrival in response to a query to the home assistant.

In some implementations, instructions are provided by the geolocation polling system 101 to the home monitoring system 112 based on a difference in a current set of home settings 130 in the home 108 and a desired set of home settings 130 in the home 108 for when the driver 104 arrives at the home 108. A difference in home settings 130 can be a status (e.g., on/off status) of an appliance (e.g., an oven, a coffeemaker, a washing machine, etc.), a difference in temperature setting or operation of an HVAC system (e.g., A/C unit, heater unit, fans, etc.), a difference in operating parameters of a security system (e.g., armed/disabled, a sensitivity setting, etc.), or the like.

In some implementations, the home monitoring system 112 can provide to the geolocation polling system 101 information including an amount of time for home 108 to reach one or more home settings 130 (e.g., a desired ambient temperature in the home 108, a setting for an appliance, or the like) based in part on the desired home setting 130 and a current status of the home setting 130. The geolocation polling system 101 can determine, from the amount of time provided, to increase a polling frequency of a location of the user device 110 corresponding to when the user device 110 is a distance from home 108 that will require the amount of time to arrive home 108. For example, the home monitoring system 112 can determine that an HVAC system for home 108 requires 15 minutes to reach a preferred temperature (e.g., 75° F.) from a current temperature setting (e.g., 65° F.) and provide this information to the geolocation polling system 101. The geolocation polling system 101 can send polling instructions to the user device 110 to increase polling frequency when the user device 110 is determined to be within a certain range from arriving to home 108 (e.g., 20-22 minutes), such that when the user device 110 is determined to be 15 minutes from home 108, the home monitoring system 112 can provide instructions to the HVAC system to ramp up to the preferred temperature setting.

In some implementations, information about the home monitoring system 112 to the geolocation polling system 101 can cause the geolocation polling system 101 to instruct the user device 110 to enable or disable the location tracking system. For example, a different driver may arrive to home 108 prior to the expected arrival of driver 104 such that the home automation systems are activated by the different driver, removing the need to track driver 104 within the geo-fences 106*a*, 106*b*.

In some implementations, geolocation polling system 101 can track multiple user devices 110 each associated with a different driver 104 that are arriving to home 108. The geolocation polling system 101 can determine a particular user device 110 and associated driver 104 that is expected to arrive to home 108 first and prioritize tracking the particular user device 110. If the geolocation polling system 101 determines that a user device 110 that was previously determined to be first to arrive to home 108 has stopped or re-routed, e.g., detoured for groceries, then the geolocation polling system 101 can re-prioritize the multiple user devices 110 to determine which is now expected to be first to arrive.

Figure 2:
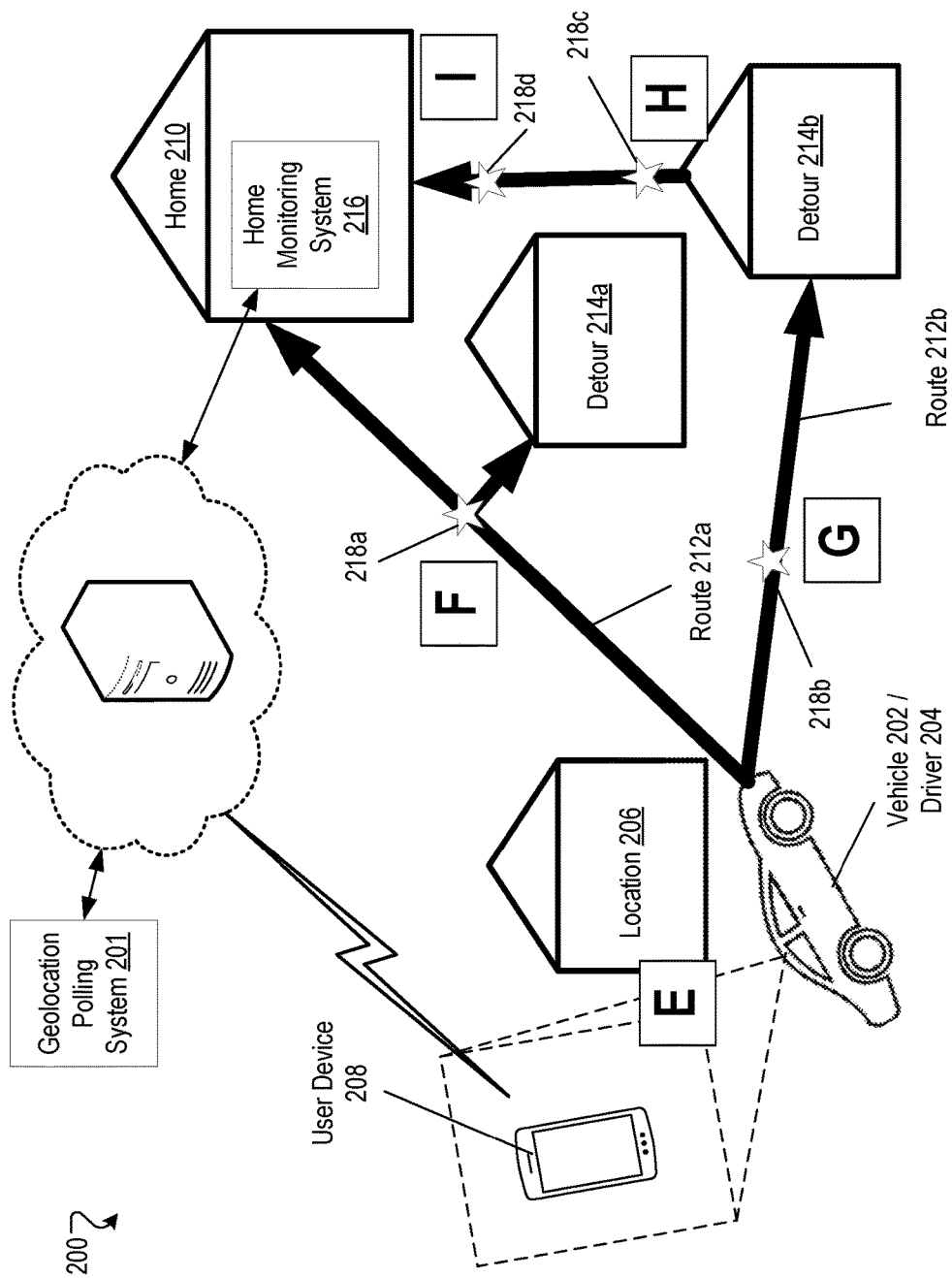
FIG. 2 is another example operating environment for a geolocation polling system.

FIG. 2 is another example operating environment 200 for a geolocation polling system 101. In stage E, vehicle 202 and associated driver 204 are determined to be departing from location 206. In some implementations, location 206 is a work location, a place of business, a school location, a park location, a transit location, or the like. A departure determination can be made, for example, based on determining that the driver's user device 208 has disconnected from a local network (e.g., Wi-Fi network, Bluetooth network, etc.) associated with location 206.

In some implementations, a departure determination can be made based on determining that the driver 204 has departed from the location 206, for example, using data collected by surveillance devices (e.g., cameras and/or sensors) from the location 206. For example, a security camera at location 206 near a main entrance/exit can detect the driver 204 departing from the location 206 and/or entering vehicle 202, and can report the departure to the geolocation polling system 201.

In some implementations, a departure determination can be based on an explicit indication by the driver 204 through a user application on the user device 208, for example, by a driver 204 activating a mapping application, a home monitoring system application, a geolocation polling application, or the like.

Driver 204 can have multiple route options when departing location 206 before arriving at home 210. For example, as depicted in FIG. 2, a driver 204 may depart location 206 and take route 212a or route 212b to get to home 210. Route 212a includes a possible detour 214a (e.g., a coffee shop, a grocery store, or the like) at which driver 204 may stop along route 212a on the way to home 210. Detour 212a can be a stop that the driver 204 makes sporadically without an established pattern that can be determined. For example, route 212a can be a commuting route between a work location 206 to home 210 for driver 204 where the driver 204 occasionally stops to pick up at a dry cleaner 214a when applicable. Route 212b includes a detour 214b (e.g., a daycare/school pickup) at which the driver 204 routinely stops along route 212b on the way to home 210. For example, route 212b can be a regular commuting route for driver 204 from work to home, with a stop at daycare location 214b to pick up a child.

The geolocation polling system 101 can determine which particular route 212a, 212b a driver 204 is taking, for example, based on a determined location of the user device 208 using GPS coordinates from the user device 208 once the vehicle 202 is driving along the particular route. The particular route 212a, 212b can be determined based on self-reporting through the user device 208 from the driver 204, e.g., by initiating a route in a mapping application, a geolocation polling application, or the like. In some implementations, the particular route 212a, 212b can be determined based on user patterns, for example, if a user takes a same commuting route 212a every weekday between a gym location 206 and home 210.

Based on a particular route 212a, 212b that the driver 204 of vehicle 202 is taking, a first location polling frequency can be determined. An initial polling frequency can be a same polling frequency for multiple different routes to home 210, or a different polling frequency depending on the particular route selected. For example, the geolocation polling system 201 can send instructions to user device 208 to poll at a first frequency (e.g., every 5 minutes) if the vehicle is determined to be on route 212a, and at a second frequency (e.g., every 7 minutes) if the vehicle is determined to be on route 212b.

In some implementations, a next polling interval can be determined based on the particular route 212a, 212b that the driver 204 is taking. For example, based on driver patterns, the geolocation polling system 101 can determine that it takes the driver a minimum of 12 minutes and a maximum of 19 to travel from location 206 to point 218a where a possible detour 214a along route 212a is located, and set a first check-in polling interval for 12 minutes from a time that the driver 204 is determined to leave location 206. At the first check-in the geolocation polling system 101 may determine that the driver 104 has not yet reached point 218a detour 214a due to increased traffic and may set a next check-in interval based on the level of traffic, e.g., 5 minutes in the future.

In some implementations, if the driver 204 is determined to be close to a decision point, e.g., between taking route 212a and route 212b, the geolocation polling system 201 might send instructions to the user device 208 to poll several times in quick succession, so that the geolocation polling system 201 can determine as soon as driver 204 has chosen between one of the multiple routes. The geolocation polling system 201 may wait longer intervals while the user device 208 is determined to be along a route 212a but not near by a decision point, such that a next check-in is delayed until the driver 204 is expected to reach the decision point, e.g., point 218a.

In stage F, along the route 212a, the driver 204 can detour to location 214a or maintain the main route 212a towards home 210. The geolocation polling system 201 can update instructions including a polling frequency or a next polling interval for user device 208 based, in part, on whether the driver 204 is determined to be detouring to location 214a. In the example depicted in FIG. 2, the location of the vehicle is determined (e.g., based on GPS data from user device 208) to be at 218a along route 212a which is at a point along the route 212a where the driver 204 can stop at detour 214a.

In some implementations, the geolocation polling system 201 can determine that a driver 204 of vehicle 202 is taking a detour based on a change in transit methods being used by the driver 204, for example, switching from driving vehicle 202 to walking. A change in transit methods can be determined, for example, by a change in speed in the movement of the user device 208 using the location of the user device 208 polled at multiple sequential intervals. A change in transit methods can be determined based on a location of the user device 208 using location-tracking services, e.g., the user device 208 is determined to be in a shopping mall which may mean driver 204 is walking, or that user device 208 is determined to be on a rail-line which may mean driver 204 is on a train or light-rail. In some implementations, a change in transit methods can be determined using sensor data, e.g., accelerometer data, a Bluetooth cadence sensor, or the like, and may not require using GPS data or cellular tower data.

In some implementations, the user device 208 can provide information related to a current transit method to the geolocation polling system 201. For example, the user device 208 can determine a change in transit method (e.g., using accelerometer data, GPS data, etc.) and notify the geolocation polling system 201 of the change.

In some implementations, the geolocation polling system 101 can determine that a driver 204 of vehicle 202 is taking a detour based on a received notification from the user device 208 that the user device 208 is connected to a local network at the detour 214a, e.g., connected to a local Wi-Fi network at the detour 214a.

In some implementations, the geolocation polling system 201 can determine that a driver 204 is taking a detour based on receiving location updates where the user device 208 is in a same location for multiple polling intervals. For example, if the driver 204 stops at a restaurant to eat and is seated, the user device 208 may send multiple stagnant location updates in a row to the geolocation polling system 201.

In some implementations, the geolocation polling system 101 can request input from a driver 104 through the user application 128. For example, the geolocation polling system 101 can request information related to an intended destination through the user application 128, e.g., "Are you planning on going to the grocery store today?" or the like. A driver 104 may provide explicit information about a planned destination and/or planned detours, for example, by enabling information sharing between a mapping application having a particular destination input, and the geolocation polling system 101.

Based on a location of vehicle 202 in stage F, the geolocation polling system 201 can update the polling frequency for the user device 208, for example, increase the polling frequency, if the driver 204 of vehicle 202 is continuing to drive towards home 210. The polling frequency can be updated to decrease the polling frequency, if the driver 204 of vehicle 202 is determined to be on a detour 214a, for example, stopping to get coffee, picking up dry cleaning, going to eat at a restaurant, or the like.

In some implementations, the polling frequency can be adjusted based in part on driver pattern recognition and/or driver history. Driver patterns (e.g., driver pattern data 118) can be used to estimate how long the driver 204 will be at the detour 214a. For example, a driver may stop at detour 214a for a consistent range of time (e.g., 5-10 minutes to buy coffee). The geolocation polling system 201 can provide instructions to the user device 208 to wait for a time associated with how long the driver 204 is estimated to be stopped at the detour 214a (e.g., a 10 minute interval) before polling for location again. In another example, the geolocation polling system can provide instructions to the user device 208 to notify the geolocation polling system 101, e.g., by generating an alert to the geolocation polling system 201, when the user device 208 determines that the vehicle 202 is moving again (e.g., the GPS is activated, or driver 204 activates the geolocation polling application).

In some implementations, a driver 204 can take a detour 214b, where the driver stops along route 212b at the detour 214b consistently. In stage G, the user device 208 updates a location 218b of the user device. Based on the location of the user device 208 associated with vehicle 202, the geolocation polling system 201 can update the polling frequency instructions to provide to the user device 208 to an updated polling frequency. The updated polling frequency can depend, for example, on detour 214b, where the geolocation polling system 101 can send instructions to the user device 208 to wait to poll a next location until after the driver 204 of vehicle 202 will leave the detour 214b. For example, point 218b can be associated with a routine for driver 204 in driver pattern data (e.g., driver pattern data 118) where travel time is approximately 45 minutes to get from point 218b until the vehicle 202 departs from detour 214b. The geolocation polling system 101 can provide instructions to the user device 208 to set a next polling interval to be 45 minutes in the future.

In stage H, the user device 208 updates a location 218c of the user device 208 to the geolocation polling system 101. The geolocation polling system 101 can provide instructions including updated polling frequency instructions to the user device 208. In one example, location 218c may be within a particular radius surrounding the home, e.g., geo-fence 106a as depicted in FIG. 1.

In stage I, vehicle 202 is determined to be at a point 218d along route 212b based on location data provided by user device 208 to the geolocation polling system 101. The geolocation polling system 101 can determine that point 218d corresponds to a distance from home 210 at which home 210 needs to update home monitoring system 216 to provide home automation instructions, similar to what is described above with reference to Stage D in FIG. 1.

In some implementations, status of a battery for the user device 208 can be used to determine a polling frequency for the user device 208. The user device 208 can provide the battery status for the user device 208 to the geolocation polling system 201. The status of the battery includes a level of charge of the battery and whether or not the battery is being charged (e.g., plugged into a charging port for vehicle 202). For example, if the battery level is low on the user device 208, the polling frequency may be decreased such that the location-tracking services are accessed less frequently, in order to preserve battery life. In another example, if the battery is actively being charged, the polling frequency may not be affected by a current battery level of the user device 208.

In some implementations, driver 204 of user device 208 can provide battery-saving preferences to the geolocation polling system 201. The driver 204 can set a threshold for a maximum polling frequency allowable when the user device 208 has a battery level below a particular level. For example, a threshold can be a maximum polling frequency of every 2 minutes when the user device 208 has a battery level below 25% charged.

In some implementations, the geolocation polling system 201 can generate a battery-saving power budget based on a rate of battery drain for the user device 208 and an estimated time to arrive at home 210, where the power budget can be formulated to maintain a particular level of battery life until the user device 208 arrives home 210. In one example, the power budget may be 15% of the total remaining battery power such that the geolocation polling system 201 sets a next interval for polling location based on when the user device 208 is expected to arrive at home 210, e.g., less frequently if the user device 210 is still far away so as to preserve the remainder of the power budget until the user device 208 is approaching home 210.

Figure 3:
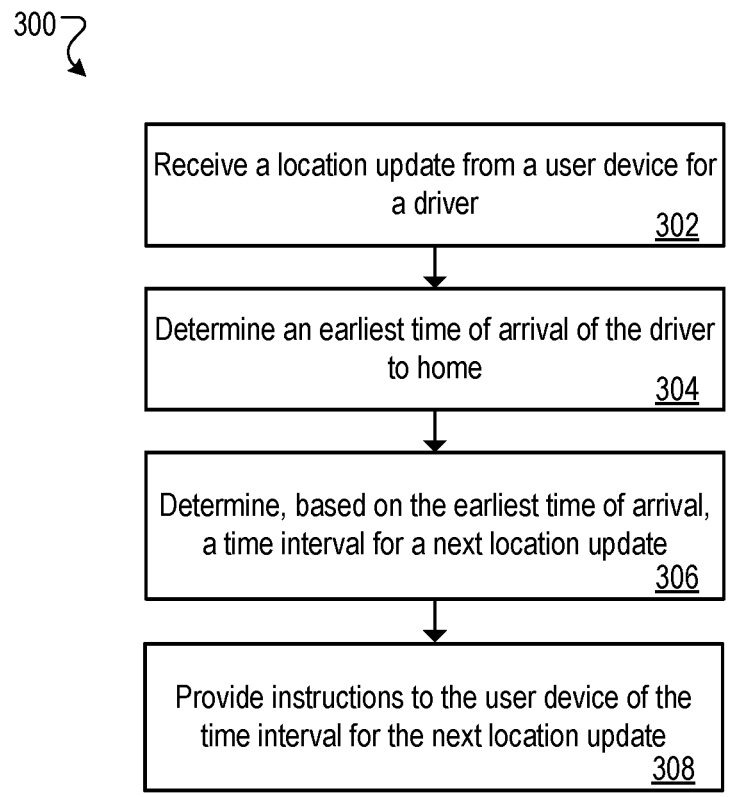
FIG. 3 is a process flow diagram of an example process for dynamic geolocation polling.

FIG. 3 is a process flow diagram of an example process 300 for dynamic geolocation polling. A location update is received from a user device (e.g., user device 208 or user device 110) for a driver (e.g., driver 104 or driver 204) (302). A location update may be received from a user device of a user. For example, the server 103 may receive a location update from the user device 110 used by the driver 104. In some implementations, receiving a location update from a user device of a user includes receiving location data from the user device. For example, the location update from the user device 110 can include location data from a GPS system or another location tracking system included in the user device 110 or included in an onboard computer of the vehicle 102. The location update may be provided to the geolocation polling system (e.g., geolocation polling system 101, 201), where the geolocation polling system can access driver pattern data, $3^{rd}$ party data (e.g., traffic data, weather data, etc.).

An earliest time of arrival is determined for the driver to home (304). An earliest time of arrival of the user to a home may be determined. For example, the server 103 may determine that the earliest time of arrival of the driver 104 is one hour from a current time. In some implementations, determining an earliest time of arrival of the user to a home includes determining an earliest time that it is possible for the user to arrive at the home based on a location of the user as the earliest time of arrival of the user to the home. For example, the server 103 may determine that the earliest time that the driver 104 might possibly arrive at home is in thirty minutes and, in response, determine the earliest time of arrival as thirty minutes from a current time.

The earliest time of arrival for the driver of the vehicle can depend, in part, on traffic in the area around the vehicle, one or more detours that the driver may take on the way to home, a speed at which the driver is moving, modes of transit, and the like. Earliest time of arrival can be an approximate "best-case scenario" where the geolocation polling system determines a closest arrival time based on the information available for the route and the modes of transit. For example, the earliest time of arrival can depend on real-time traffic data, traffic light patterns, real-time weather reports, public transit schedules, and the like.

In some implementations, determining an earliest time of arrival of the user to a home includes determining a current mode of transportation of the user and determining an earliest time of arrival of the user to the home from the location of the user with the current mode of transportation of the user as the earliest time of arrival of the user to the home. For example, the server 103 may determine that the driver 104 is driving, in response, determine that at the fastest possible driving speed for the driver 104, the driver 104 will need thirty minutes to drive home from the user's current location, and, in response, determine the earliest time of arrival of the user to the home as thirty minutes from a current time. In another example, the server 103 may determine that the user is walking, in response, determine that at the fastest possible walking speed for the user, the user will need twenty minutes to walk home from the user's current location, and, in response, determine the earliest time of arrival of the user to the home as twenty minutes from a current time.

In some implementations, determining an earliest time of arrival of the user to a home includes determining that the user device is within a particular geo-fence and determining the earliest time of arrival of the user based on a polling frequency that is associated with the particular geo-fence. For example, the server 103 may determine that the user device 110 is in geo-fence 106a, determine that the geo-fence 106a is associated with a polling frequency of five minutes, and, in response, determine the earliest time of arrival of the user as five minutes.

In some implementations, determining the earliest time of arrival of the user based on a polling frequency that is associated with the particular geo-fence includes determining the earliest time of arrival of the user based on a polling frequency that is associated with the particular geo-fence and driver pattern recognition. For example, the server 103 may determine a likely driving path that the driver 104 is taking and, in response, adjust the polling frequency associated with the geo-fence 106a based on the likely driving path.

A time interval for a next location update is determined (306). Based on the earliest time of arrival, the geolocation polling system can determine a next interval and/or a polling frequency for a location update from the user device. In one example, the further in the future that the earliest time of arrival is occurring, the larger the polling frequency (e.g., a longer interval before polling location).

In some implementations, the geolocation polling system can determine a next interval and/or a polling frequency for a location update from the user device based on a location of the vehicle relative to one or more geo-fences (e.g., geo-fences 106a, 106b). For example, the vehicle can be determined to be located within a region defined by a first geo-fence having a first polling frequency.

In some implementations, determining, based on the earliest time of arrival, a time interval for a next location update includes determining the time interval to be an interval of time that is shorter than a difference between a current time and the earliest time of arrival of the user to the home. For example, the server 103 may determine that the earliest time of arrival of the driver 104 to the home is twenty minutes from now and, in response, determine the time interval to be ten minutes. In another example, the server 103 may determine that the earliest time of arrival of the driver 104 to the home is twenty minutes from now and, in response, determine the time interval to be eighteen minutes.

Instructions are provided to the user device including the time interval for the next location update (308). The geolocation polling system can provide instructions to the user device including a polling frequency and/or a time interval for a next location update. For example, the geolocation polling system can provide instructions to the user device to next provide a location update 10 minutes in the future from the point of receiving the instructions, or from the point of the previous location update. In some implementations, providing instructions to the user device of the time interval for a next location update includes providing the user device an indication of a polling frequency. For example, the server 103 may instruct the user device 110 to provide location updates every five minutes when the polling frequency is five minutes.

Figure 4:
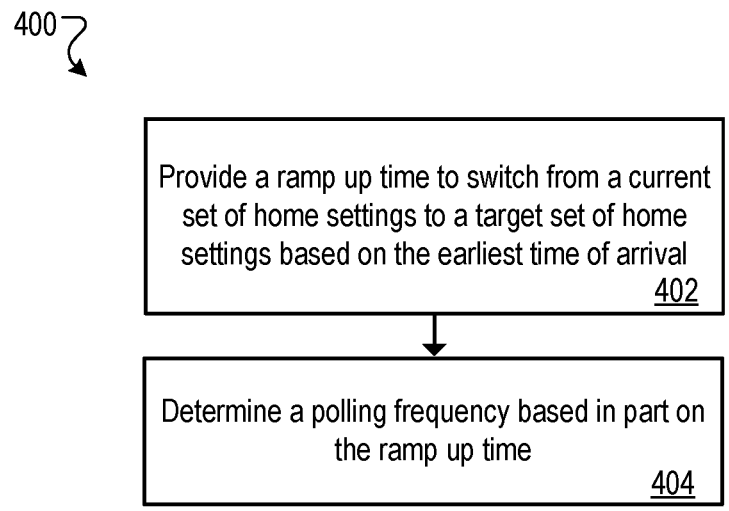
FIG. 4 is a process flow diagram of another example process for dynamic geolocation polling.

FIG. 4 is a process flow diagram of another example process 400 for dynamic geolocation polling. A ramp up time is provided to switch from a current set of home settings to a target set of home settings based on an earliest time of arrival for the vehicle to home (402). A home monitoring system can determine, based on a current set of home settings (e.g., ambient temperature, status of appliances, security system settings, etc.) and a target set of home settings (e.g., preset preferences for home settings), how long the respective systems and/or appliances will require to reach the target set of home settings. The home monitoring system can provide the ramp up time information to the geolocation polling system.

A polling frequency is determined based in part on the ramp up time (404). The geolocation polling system can receive the ramp up time for the home settings from the home monitoring system and determine the polling frequency based on the ramp up time. The geolocation polling system can determine to increase a polling frequency around a time interval that corresponds to the vehicle being a distance away from home and which corresponds to a travel time equal to the ramp up time provided by the home monitoring system. For example, if a ramp up time for the home automation of the home is 20 minutes, the polling frequency may be increased when the earliest time of arrival, based on the location of the vehicle, to the home is 20 minutes.

In some implementations, the current home settings can be adjusted to be mid-point closer to the target set of home settings when the vehicle is determined to depart from the work location (e.g., location 206), and then ramped up the final amount to the target set of home settings as the vehicle 202 is determined to be within a threshold range of the home 210. For example, an HVAC system can be ramped from a starting temperature of 60° F. to a mid-point of 70° F. when the vehicle 202 is determined to leave work 206, and then finish ramping the temperature to the target temperature 75° F. when the vehicle 202 is determined to be 10 minutes away from arriving at home 210.

In some implementations, the geolocation polling system 101 can use typical travel times for the expected modes of travel for the user device 110 (e.g., car, public transit, walking, etc.), and can calculate a window in which the user device 110 is expected to arrive at home 108. One or more check-in intervals can be set based on an earliest time that the user device 110 can arrive home, and based in part on a ramp-up time for one or more home automation functions (e.g., HVAC climate control settings, turning porch lights on, etc.). In one example, based on a current location of the driver 104 during a particular location check-in, the geolocation polling system 101 may determine that the driver 104 is arriving home within a threshold amount of time and send instructions to the home monitoring system 112 to set the home settings 130. In another example, the geolocation polling system 101 may determine that the driver 104 is not within the threshold amount of time to activate home settings 130 but is on schedule with an expected time of arrival. An updated, shorter interval can be set for a next check-in, which can become shorter as the driver 104 is determined to be arriving to the home 108. In another example, the geolocation polling system 101 may determine that the driver 104 has chosen an alternate route or a detour and sets an updated, longer interval for a next check-in.

In some implementations, if the user application 128 detects (e.g., based on non-GPS means) that the driver 104 has unexpectedly switched to a faster mode of transport, it may alert the geolocation polling system 101 of this change in transit mode in order to receive updated polling instructions. The geolocation polling system 101 may provide multiple sets of polling instructions to the user device 110, each set of instructions for a particular scenario (e.g., a type of transit mode, traffic/no-traffic mode, detour/no detour, etc.), such that the user device 110 can automatically switch to a particular set of polling instructions as it determines that the driver 104 has changed to a different scenario.

Figure 5:
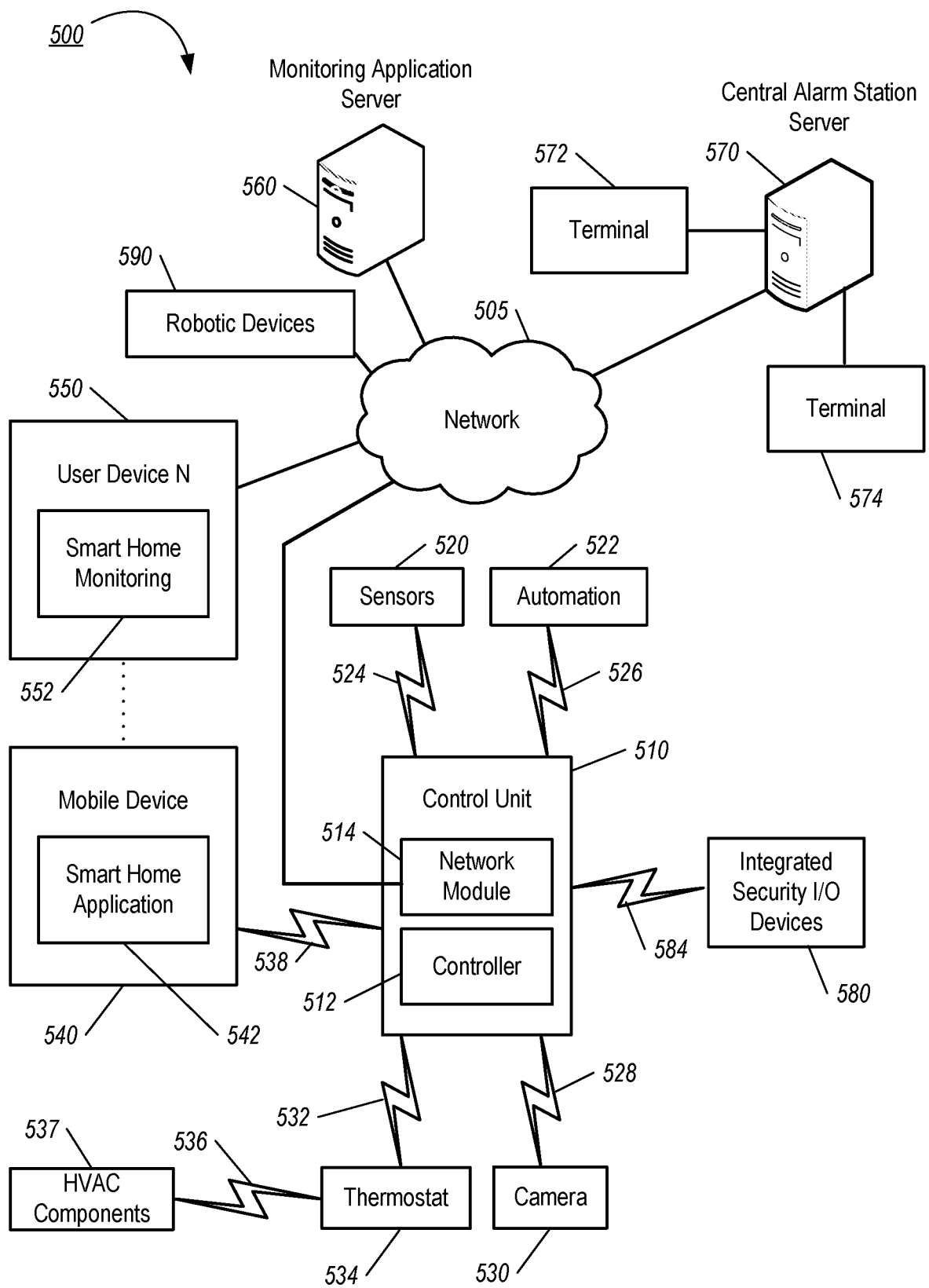
FIG. 5 shows a diagram illustrating an example home monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system monitoring 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the monitoring system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the monitoring system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the monitoring system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The monitoring system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the automation controls 522, possibly through the control unit 510.

The monitoring server 560 can be configured to provide information (e.g., activity patterns) related to one or more residents of the home monitored by the system 500 (e.g., driver 104, driver 204). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home monitoring 552. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home monitoring 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the monitoring system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the monitoring system 500 provides end users with access to images captured by the camera 530 to aid in decision making. The monitoring system 500 may transmit the images captured by the camera 530 over a wireless WAN network to the user devices 540 and 550. Because transmission over a wireless WAN network may be relatively expensive, the monitoring system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
receiving a location update from a user device of a user;
determining an earliest time of arrival of the user to a home;
determining a ramp up time required to reach a target set of home settings from a current set of home settings;
determining, based on both the ramp up time and the earliest time of arrival, a time interval for a next location update from the user device;
providing, based on the determined time interval for the next location update, instructions to the user device that instruct the user device to set a time interval for the next location update to the determined time interval and to provide the next location update at a future time; and receiving, from the user device and in response to the instructions, the next location update from the user device at the future time.

2. The method of claim 1, wherein receiving a location update from a user device of a user comprises:
receiving location data from the user device.

3. The method of claim 1, wherein determining an earliest time of arrival of the user to a home comprises:
determining an earliest time that it is possible for the user to arrive at the home based on a location of the user as the earliest time of arrival of the user to the home.

4. The method of claim 1, wherein determining an earliest time of arrival of the user to a home comprises:
determining a current mode of transportation of the user; and
determining an earliest time of arrival of the user to the home from the location of the user with the current mode of transportation of the user as the earliest time of arrival of the user to the home.

5. The method of claim 1, wherein determining, based on the earliest time of arrival, a time interval for a next location update comprises:
determining the time interval to be an interval of time that is shorter than a difference between a current time and the earliest time of arrival of the user to the home.

6. The method of claim 1, wherein providing instructions to the user device of the time interval for a next location update comprises:
providing the user device an indication of a polling frequency.

7. The method of claim 1, wherein determining, based on the earliest time of arrival, a time interval for a next location update comprises:
determining that the user is approaching a decision point between a first route and a second, different route of a plurality of routes; and
in response to determining that the user is approaching the decision point, determining the time interval for the next location update based on when the user is expected to reach the decision point.

8. The method of claim 1, further comprising:
receiving driver pattern data for the user comprising a plurality of routes traveled by the user, each route of the plurality of routes including a range of time to arrive at the home; and
determining an earliest time of arrival of the user to a home, the determining comprising:
determining that the user device is within a particular geo-fence;
determining, from the driver pattern data and based on the location update, a particular route of the plurality of routes to arrive at the home; and
determining the earliest time of arrival of the user based on a polling frequency that is associated with the particular geo-fence and the determined particular route.

9. A system comprising:
one or more computers and one or more storage devices storing instructions that are operable, when executed by the one or more computers, to cause the one or more computers to perform operations comprising:
receiving a location update from a user device of a user;
determining an earliest time of arrival of the user to a home;
determining a ramp up time required to reach a target set of home settings from a current set of home settings;
determining, based on both the ramp up time and the earliest time of arrival, a time interval for a next location update from the user device;
providing, based on the determined time interval for the next location update, instructions to the user device that instruct the user device to set a time interval for the next location update to the determined time interval and to provide the next location update at a future time; and
receiving, from the user device and in response to the instructions, the next location update from the user device at the future time.

10. The system of claim 9, wherein receiving a location update from a user device of a user comprises:
receiving location data from the user device.

11. The system of claim 9, wherein determining an earliest time of arrival of the user to a home comprises:
determining an earliest time that it is possible for the user to arrive at the home based on a location of the user as the earliest time of arrival of the user to the home.

12. The system of claim 9, wherein determining an earliest time of arrival of the user to a home comprises:
determining a current mode of transportation of the user; and
determining an earliest time of arrival of the user to the home from the location of the user with the current mode of transportation of the user as the earliest time of arrival of the user to the home.

13. The system of claim 9, wherein determining an earliest time of arrival of the user to a home comprises:
determining that the user device is within a particular geo-fence; and
determining the earliest time of arrival of the user based on a polling frequency that is associated with the particular geo-fence.

14. The system of claim 13, wherein determining the earliest time of arrival of the user based on a polling frequency that is associated with the particular geo-fence comprises:
determining the earliest time of arrival of the user based on a polling frequency that is associated with the particular geo-fence and driver pattern recognition.

15. The system of claim 9, wherein determining, based on the earliest time of arrival, a time interval for a next location update comprises:
determining the time interval to be an interval of time that is shorter than a difference between a current time and the earliest time of arrival of the user to the home.

16. The system of claim 9, wherein providing instructions to the user device of the time interval for a next location update comprises:
providing the user device an indication of a polling frequency.

17. The system of claim 9, wherein determining, based on the earliest time of arrival, a time interval for a next location update comprises:
determining that the user is approaching a decision point; and
in response to determining that the user is approaching the decision point, determining the time interval for the next location update based on when the user is expected to reach the decision point.

18. A non-transitory computer-readable medium storing software comprising instructions executable by one or more computers which, upon such execution, cause the one or more computers to perform operations comprising:
receiving a location update from a user device of a user;

determining an earliest time of arrival of the user to a home;

determining a ramp up time required to reach a target set of home settings from a current set of home settings;

determining, based on both the ramp up time and the earliest time of arrival, a time interval for a next location update from the user device;

providing, based on the determined time interval for the next location update, instructions to the user device that instruct the user device to set a time interval for the next location update to the determined time interval and to provide the next location update at a future time; and receiving, from the user device and in response to the instructions, the next location update from the user device at the future time.

19. The medium of claim 18, wherein receiving a location update from a user device of a user comprises:

receiving location data from the user device.

* * * * *